March 3, 1931.  H. J. BURNISH  1,794,363

ELECTRIC ARC WELDING

Filed Nov. 2, 1929

INVENTOR.
Howard J. Burnish
BY
ATTORNEY.

Patented Mar. 3, 1931

1,794,363

UNITED STATES PATENT OFFICE

HOWARD J. BURNISH, OF MILWAUKEE, WISCONSIN

ELECTRIC-ARC WELDING

Application filed November 2, 1929. Serial No. 404,413.

This invention relates to electric arc welding.

The object of the invention is to provide a welded seam in sheet or plate metal which has increased tensile strength and ductility.

Another object of the invention is to provide a welding scarf for the edges to be welded which will facilitate the welding operation and enable the welding of metal sheets by a single pass of the electric welding arc along the edges.

Other objects will appear hereinafter with reference to the embodiment illustrated in the accompanying drawings in which the views are as follows.

Figure 1:
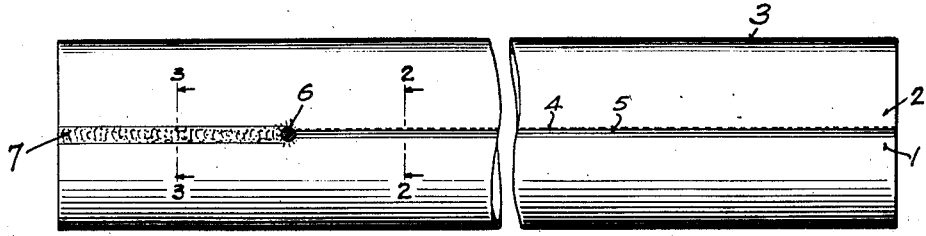
Fig. 1 is a top plan view of a pipe section showing the operation of welding a longitudinal seam therein.
Figure 2:
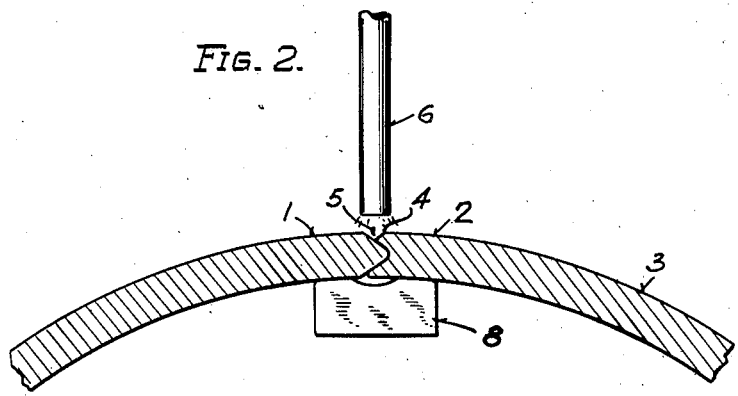
Fig. 2 is a fragmentary section of the pipe on line 2—2 of Fig. 1.
Figure 3:
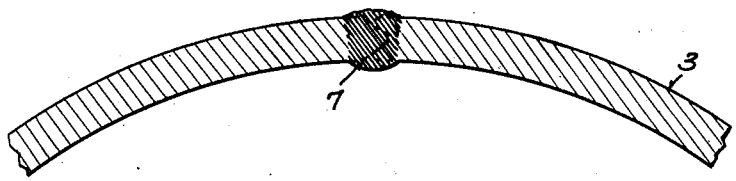
Fig. 3 is a similar section on line 3—3 of Fig. 1.

In carrying out the invention the edges 1 and 2 of the pipe 3 or other article to be welded are formed to provide a tongue and groove interlock therebetween. The edge 1 is tapered to fit into the tapered recess or groove in the edge 2. The outer corner 4 of the edge 2 is preferably cut away to provide a small groove 5 along the seam to be welded.

In the welding operation, the edges 1 and 2 are pressed in interlocked position and an electrode 6 is passed along the seam in arcing relation thereto. The electrode 6 is preferably of fusible metal which is melted by the arc and deposited along the seam to provide a weld 7 of proper thickness. A chill block 8, having a groove therein, molds the lower part of the edges and weld, and prevents injury to the work due to the high concentration of heat by the arc required to obtain the complete penetration of the weld through the edges.

The interlocking of the edges alines the same and allows the application of pressure thereto during the welding operation without danger of disalinement of the edges. Furthermore, the tapered fit of the tongue and groove interlocked edges excludes air and other contaminating elements from the weld and enables the production of a weld of the parent metal stock having an absence of blow holes and other defects, and having high tensile strength and ductility.

I claim:

1. In electric arc welding, the steps which comprise providing tapered interlocking edges for the parts being welded removing the outer corners of the meeting edges to provide a groove along the seam to be welded, and electric arc welding said edges together.

2. In electric welding, the steps which comprise providing a tapered tongue and groove for interlocking the edges of the parts being welded, pressing said edges together, and progressively fusing the same together by the application of an electric arc thereto.

3. In electric arc welding, the steps which comprise providing a tapered complementary tongue and groove for interlocking the edges of the parts being welded, pressing said edges together, and applying an electric arc there along to heat said interlocked edges and weld the same together.

In witness whereof, I have signed my name at Milwaukee, Wisconsin, this 31st day of October, 1929.

HOWARD J. BURNISH